US012288497B2

(12) United States Patent
Fu

(10) Patent No.: US 12,288,497 B2
(45) Date of Patent: *Apr. 29, 2025

(54) DISPLAY PANEL, DRIVING METHOD THEREOF, AND DISPLAY DEVICE

(71) Applicant: Hubei Yangtze Industrial Innovation Center Of Advanced Display Co., Ltd., Wuhan (CN)

(72) Inventor: Jujian Fu, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,522

(22) Filed: Dec. 1, 2023

(65) Prior Publication Data

US 2024/0105092 A1 Mar. 28, 2024

Related U.S. Application Data

(63) Continuation of application No. 18/089,692, filed on Dec. 28, 2022, now Pat. No. 11,869,404.

(30) Foreign Application Priority Data

Jun. 29, 2022 (CN) ......................... 202210760958.5

(51) Int. Cl.

| | |
|---|---|
| ***G09G 3/20*** | (2006.01) |
| ***G09G 3/32*** | (2016.01) |
| ***G09G 3/3233*** | (2016.01) |

(52) U.S. Cl.

CPC ................. *G09G 3/20* (2013.01); *G09G 3/32* (2013.01); *G09G 3/3233* (2013.01); (Continued)

(58) Field of Classification Search

None

See application file for complete search history.

(56) References Cited

U.S. PATENT DOCUMENTS 10,878,752 B1 * 12/2020 Li ......................... G09G 3/3225
11,107,411 B1 * 8/2021 Zhang .................. G09G 3/3258
(Continued)

FOREIGN PATENT DOCUMENTS

CN 110827756 A 2/2020
KR 20190047332 A 5/2019

*Primary Examiner* — Dorothy Harris
(74) *Attorney, Agent, or Firm* — KDW Firm PLLC

(57) ABSTRACT

A pixel circuit in a display panel includes a drive transistor and a first transistor, a first terminal of the drive transistor is electrically connected to a power signal line, a first terminal of the first transistor is electrically connected to an initialization signal line; a second terminal of the first transistor is electrically connected to the drive transistor, or the second terminal of the first transistor is electrically connected to the light-emitting element; and drive modes of the display panel include a first drive mode, a second drive mode, and a third drive mode, the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$.

20 Claims, 6 Drawing Sheets

10

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2340/0435* (2013.01); *G09G 2360/16* (2013.01)

(56) References Cited

U.S. PATENT DOCUMENTS

| | | | | |
|---|---|---|---|---|
| 11,869,404 | B2 * | 1/2024 | Fu | G09G 3/20 |
| 11,881,158 | B2 * | 1/2024 | Ding | G09G 3/32 |
| 2017/0061875 | A1 * | 3/2017 | Cho | G09G 3/3233 |
| 2017/0206837 | A1 | 7/2017 | Jeon | |
| 2018/0033370 | A1 * | 2/2018 | Zheng | G09G 3/3233 |
| 2018/0293944 | A1 * | 10/2018 | Kim | G09G 3/3233 |
| 2019/0172379 | A1 | 6/2019 | Park | |
| 2020/0394962 | A1 * | 12/2020 | Seo | G09G 3/3275 |
| 2021/0020103 | A1 | 1/2021 | Yamato | |
| 2021/0248960 | A1 | 8/2021 | Lee | |
| 2021/0407386 | A1 * | 12/2021 | Li | H01L 27/124 |
| 2023/0044565 | A1 * | 2/2023 | Zhang | G09G 3/20 |
| 2023/0072885 | A1 * | 3/2023 | Cho | G06F 3/0443 |
| 2023/0137517 | A1 * | 5/2023 | Fu | G09G 3/20 345/214 |
| 2024/0105092 | A1 * | 3/2024 | Fu | G09G 3/32 |
| 2024/0112610 | A1 * | 4/2024 | Fu | G09G 3/3233 |
| 2024/0112611 | A1 * | 4/2024 | Fu | G09G 3/32 |

* cited by examiner

DISPLAY PANEL, DRIVING METHOD THEREOF, AND DISPLAY DEVICE

CROSS-REFERENCE TO RELATED APPLICATION

This is a continuation of U.S. patent application Ser. No. 18/089,692, filed on Dec. 28, 2022, which claims priority to Chinese Patent Application No. 202210760958.5 filed on Jun. 29, 2022, the disclosure of which is incorporated herein by reference in its entirety.

TECHNICAL FIELD

The present disclosure relates to the field of display technology and, in particular, to a display panel, a driving method thereof, and a display device.

BACKGROUND

In a display process of a display device, the display device may need to switch between different drive frequencies. For example, the display device switches from a relatively high frequency to a relatively low frequency or from a relatively low frequency to a relatively high frequency, so as to satisfy different display requirements.

However, there is a difference in display brightness between the different drive frequencies, which causes the problem that the display brightness can be perceived by human eyes when the different drive frequencies are switched, thereby influencing a normal display of the display device and user experience.

SUMMARY

Embodiments of the present disclosure provide a display panel, a driving method thereof, and a display device.

In a first aspect, embodiments of the present disclosure provide a display panel including a light-emitting element and a pixel circuit electrically connected to the light-emitting element.

The pixel circuit includes a drive transistor and an initialization transistor, where a first terminal of the initialization transistor is electrically connected to an initialization signal terminal, a second terminal of the initialization transistor is electrically connected to a gate of the drive transistor, a first terminal of the drive transistor is electrically connected to a power signal terminal, and a second terminal of the drive transistor is electrically connected to a first terminal of the light-emitting element. The display panel further includes an initialization signal line, where the initialization signal line is electrically connected to the initialization signal terminal and configured to transmit an initialization signal to the initialization signal terminal. Drive modes of the display panel include at least a first drive mode, a second drive mode, and a third drive mode, where the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, where $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

In a second aspect, embodiments of the present disclosure further provide a driving method of a display panel. The driving method is applied for driving the display panel described in the first aspect and includes the steps described below.

In the first drive mode, the pixel circuit is driven using the first drive frequency and the first initialization signal.

In the second drive mode, the pixel circuit is driven using the second drive frequency and the second initialization signal.

In the third drive mode, the pixel circuit is driven using the third drive frequency and the third initialization signal.

The first drive frequency $F_1$, the first initialization signal $V_{ref1}$, the second drive frequency $F_2$, the second initialization signal $V_{ref2}$, the third drive frequency $F_3$, and the third initialization signal $V_{ref3}$ satisfy that: $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

In a third aspect, embodiments of the present disclosure further provide a display device including a display panel. The display panel includes a light-emitting element and a pixel circuit electrically connected to the light-emitting element. The pixel circuit includes a drive transistor and an initialization transistor, where a first terminal of the initialization transistor is electrically connected to an initialization signal terminal, a second terminal of the initialization transistor is electrically connected to a gate of the drive transistor, a first terminal of the drive transistor is electrically connected to a power signal terminal, and a second terminal of the drive transistor is electrically connected to a first terminal of the light-emitting element. The display panel further includes an initialization signal line, where the initialization signal line is electrically connected to the initialization signal terminal and configured to transmit an initialization signal to the initialization signal terminal. Drive modes of the display panel include at least a first drive mode, a second drive mode, and a third drive mode, where the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, where $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

DETAILED DESCRIPTION

To illustrate the technical schemes in the embodiments of the present disclosure or the technical solutions in the related art more clearly, drawings used in the description of the embodiments or the related art will be briefly described below. Apparently, although the drawings described below illustrate part of the embodiments of the present disclosure, those skilled in the art may expand and extend to other structures and drawings according to the basic concepts of the device structure, driving method, and manufacturing method disclosed and indicated in the embodiments of the present disclosure. These are undoubtedly all within the scope of the claims of the present disclosure.

Figure 1:
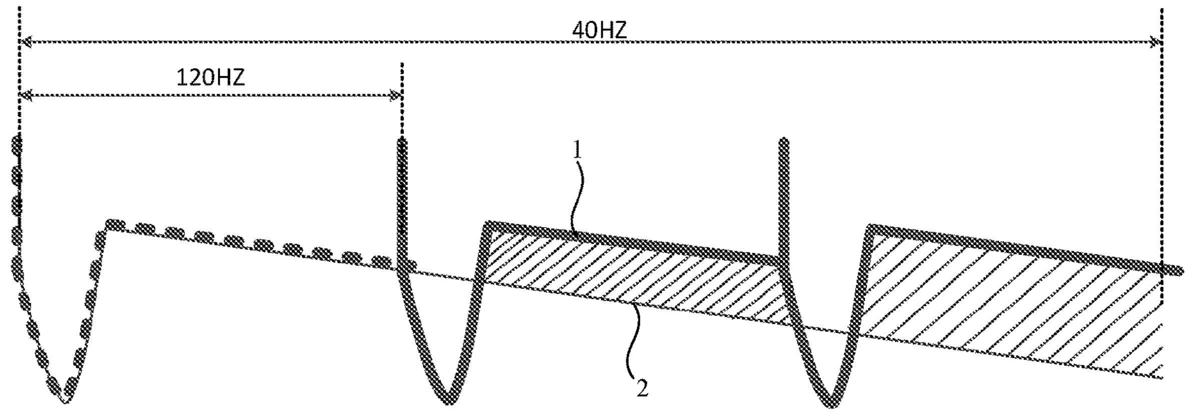
FIG. 1 is a schematic diagram showing changes in display brightness at different drive frequencies in the related art.

FIG. 1 is a schematic diagram showing changes in display brightness at different drive frequencies in the related art. As shown in FIG. 1, curve 1 shows changes in display brightness of a display panel with time when a drive frequency is 120 Hz, and curve 2 shows changes in the display brightness of the display panel with time when the drive frequency is 40 Hz. As shown in FIG. 1, brightness of the display panel is attenuated with time, and the display panel has greatly different display brightness at the different drive frequencies. For example, when the drive frequency decreases from 120 Hz to 60 Hz, the brightness of the display panel changes by 1%, when the drive frequency decreases from 120 Hz to 40 Hz, the brightness of the display panel changes by 2%, and when the drive frequency decreases from 120 Hz to 30 Hz, the brightness of the display panel changes by 3%. Thus, when the display panel switches between the different drive frequencies, the brightness decreases at inconsistent amplitudes, thereby causing the brightness changes visible to the human eyes and influencing the user experience.

It is to be noted that a dotted line in curve 1 also shows changes in the display brightness of the display panel with time when the drive frequency is 120 Hz. Since the dotted line coincides with the curve showing the changes in the display brightness of the display panel with time when the drive frequency is 40 Hz, the dotted line is adopted. Portions filled with oblique lines in FIG. 1 may show differences between the display brightness of the display panel when the drive frequency is 120 Hz and the display brightness of the display panel when the drive frequency is 40 Hz.

Based on the preceding technical issue, the embodiments of the present disclosure provide a display panel including a light-emitting element and a pixel circuit electrically connected to the light-emitting element. The pixel circuit includes a drive transistor and an initialization transistor, where a first terminal of the initialization transistor is electrically connected to an initialization signal terminal, a second terminal of the initialization transistor is electrically connected to a gate of the drive transistor, a first terminal of the drive transistor is electrically connected to a power signal terminal, and a second terminal of the drive transistor is electrically connected to a first terminal of the light-emitting element. The first terminal of the drive transistor being electrically connected to the power signal terminal includes that the first terminal of the drive transistor is directly electrically connected to the power signal terminal; or the first terminal of the drive transistor is coupled to the power signal terminal through another element such as a transistor or a capacitor, that is, another element is disposed between the first terminal of the drive transistor and the power signal terminal. The second terminal of the drive transistor being electrically connected to the first terminal of the light-emitting element includes that the second terminal of the drive transistor is directly electrically connected to the first terminal of the light-emitting element; or the second terminal of the drive transistor is coupled to the first terminal of the light-emitting element through another element such as a transistor or a capacitor, that is, another element is disposed between the second terminal of the drive transistor and the first terminal of the light-emitting element. The display panel further includes an initialization signal line, where the initialization signal line is electrically connected to the initialization signal terminal and configured to transmit an initialization signal to the initialization signal terminal. Drive modes of the display panel include at least a first drive mode, a second drive mode, and a third drive mode, where the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, where $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

According to the preceding technical solution, the display panel is set to include at least three different drive modes, where the first drive frequency $F_1$ and the first initialization signal $V_{ref1}$ in the first drive mode, the second drive frequency $F_2$ and the second initialization signal $V_{ref2}$ in the second drive mode, and the third drive frequency $F_3$ and the third initialization signal $V_{ref3}$ in the third drive mode satisfy that: $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

That is, the initialization signals are set different in the different drive modes so as to adjust the difference in the display brightness in the different drive modes, and further change degrees of the drive frequency are set different from change degrees of the initialization signal in the different drive modes so as to further adjust the display brightness in the different drive modes, thereby reducing the difference in the display brightness of the display panel at the different drive frequencies and improving the display effect.

The above is the core concept of the present disclosure, and the technical schemes in the embodiments of the present disclosure are described clearly and completely hereinafter in conjunction with the drawings in the embodiments of the present disclosure. Based on the embodiments of the present disclosure, all other embodiments obtained by those of ordinary skill in the art without creative work are within the scope of the present disclosure.

Figure 2:
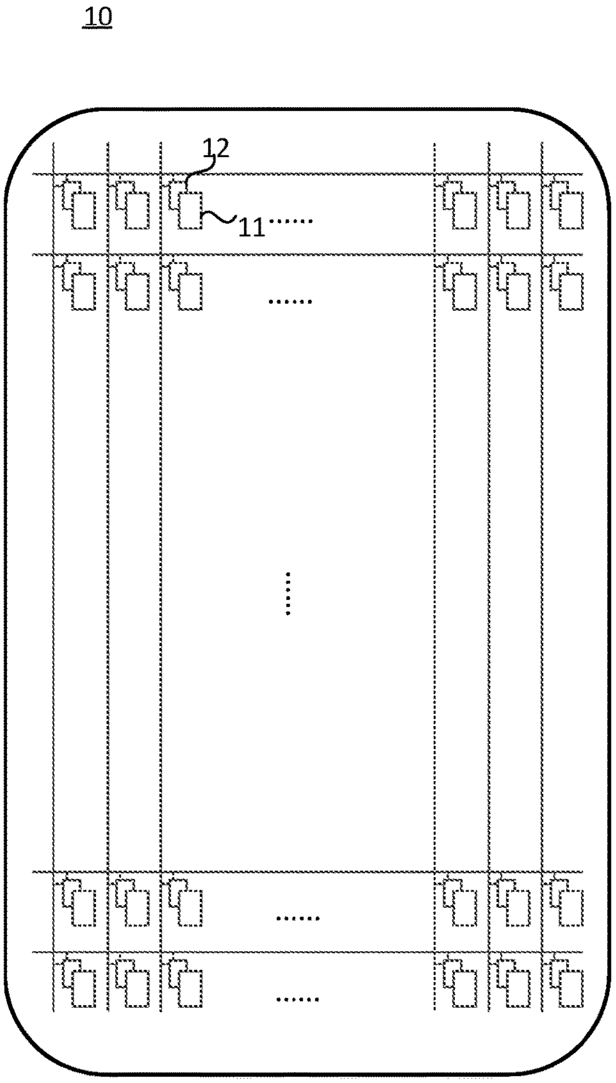
FIG. 2 is a structure diagram of a display panel according to an embodiment of the present disclosure.
Figure 3:
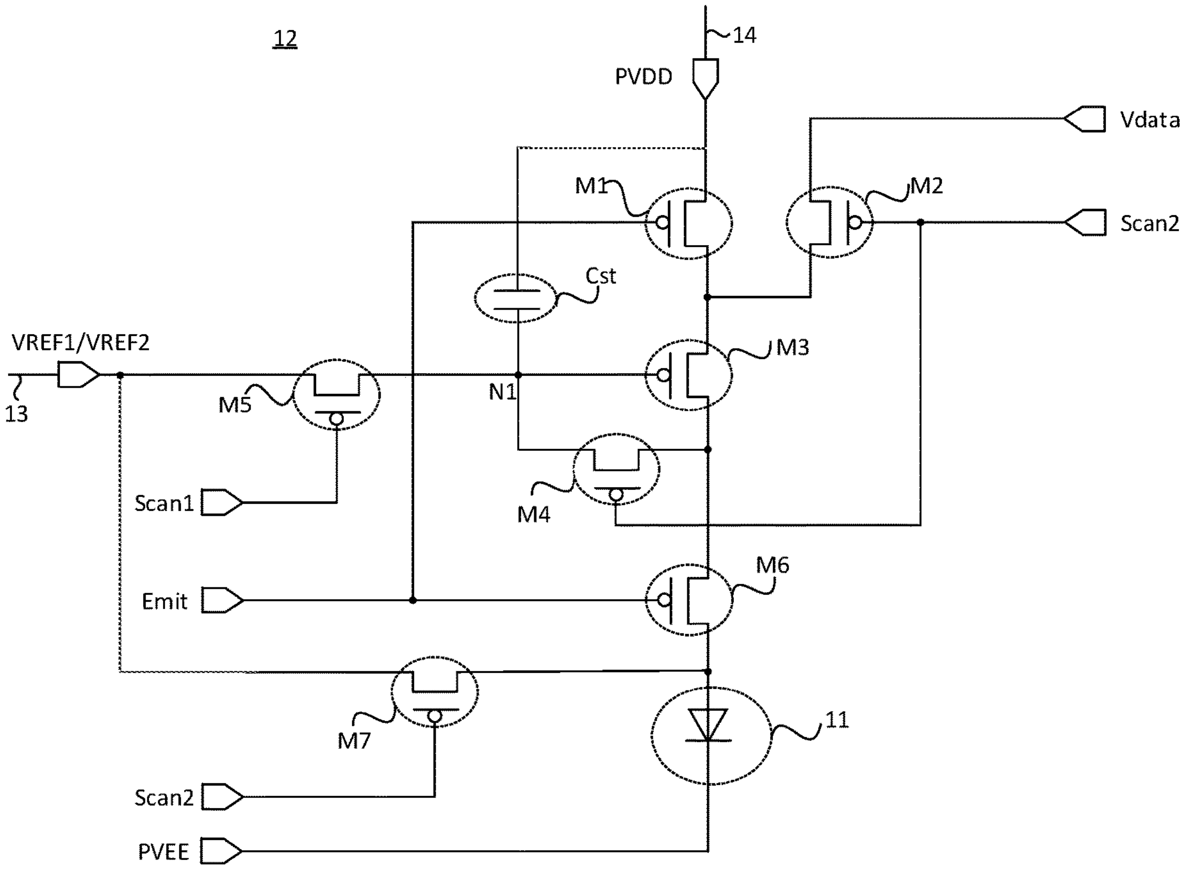
FIG. 3 is a circuit diagram of a pixel circuit according to an embodiment of the present disclosure.
Figure 4:
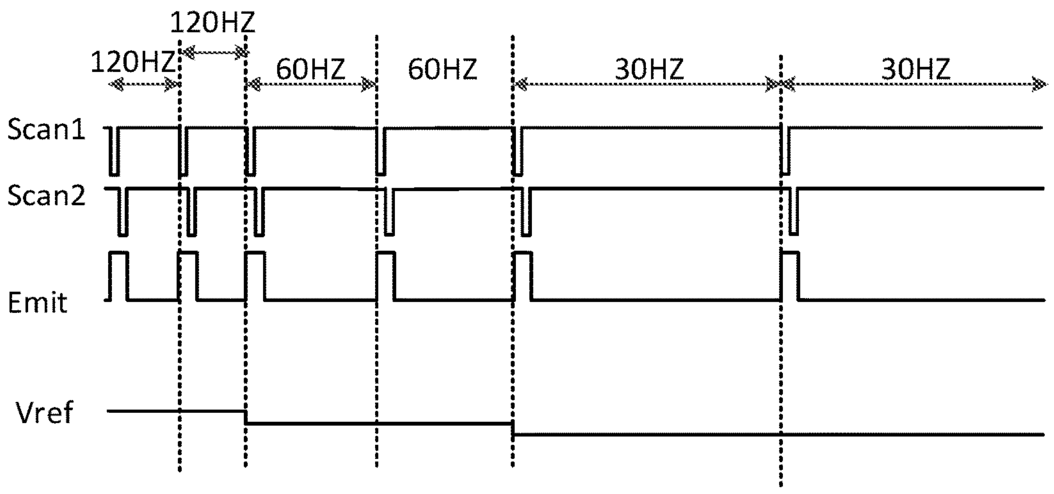
FIG. 4 is a drive timing diagram of a pixel circuit according to an embodiment of the present disclosure.
Figure 5:
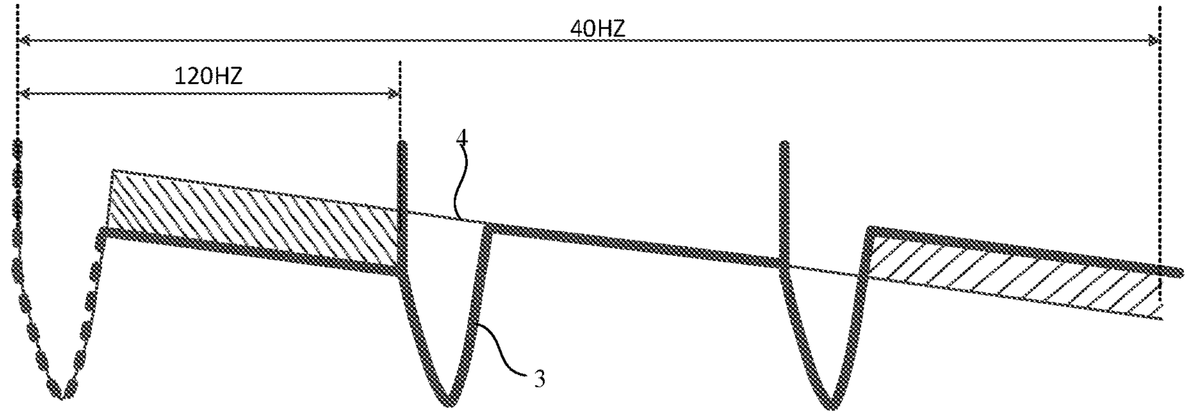
FIG. 5 is a schematic diagram showing changes in display brightness at different drive frequencies according to an embodiment of the present disclosure.

FIG. 2 is a structure diagram of a display panel according to an embodiment of the present disclosure. FIG. 3 is a circuit diagram of a pixel circuit according to an embodiment of the present disclosure. FIG. 4 is a drive timing diagram of a pixel circuit according to an embodiment of the present disclosure. FIG. 5 is a schematic diagram showing changes in display brightness at different drive frequencies according to an embodiment of the present disclosure. Referring to FIGS. 2 to 5, a display panel 10 provided by the embodiment of the present disclosure includes a light-emitting element 11 and a pixel circuit 12 electrically connected to the light-emitting element 11. The pixel circuit 12 includes a drive transistor M3 and an initialization transistor M5, where a first terminal of the initialization transistor M5 is electrically connected to an initialization signal terminal VREF1, a second terminal of the initialization transistor M5 is electrically connected to a gate of the drive transistor M3, a first terminal of the drive transistor M3 is electrically connected to a power signal terminal PVDD, and a second terminal of the drive transistor M3 is electrically connected to a first terminal of the light-emitting element 11. The display panel 10 further includes an initialization signal line 13, where the initialization signal line 13 is electrically connected to the initialization signal terminal VREF1 and configured to transmit an initialization signal to the initialization signal terminal VREF1. Drive modes of the display panel 10 include at least a first drive mode, a second drive mode, and a third drive mode, where the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, where $F_1>F_2>F_3$, $V_{ref1}\neq V_{ref2}\neq V_{ref3}$, and $$\frac{F_2-F_3}{F_1-F_3}\neq\frac{|V_{ref2}-V_{ref3}|}{|V_{ref1}-V_{ref3}|}.$$

In an embodiment, the display panel 10 includes the light-emitting element 11 and the pixel circuit 12 which are electrically connected to each other, and the pixel circuit 12 is configured to drive the light-emitting element 11 to emit light. In an embodiment, the light-emitting element 11 may be an organic light-emitting element or a micro light-emitting element. A specific type of the light-emitting element 11 is not limited in the embodiment of the present disclosure.

In an embodiment, the pixel circuit 12 may include multiple thin-film transistors and at least one storage capacitor. For example, the pixel circuit 12 may include seven thin-film transistors and one storage capacitor, forming a "7T1C" pixel circuit, or the pixel circuit 12 may include other numbers of thin-film transistors and storage capacitors, forming a "5T1C" pixel circuit or a "6T2C" pixel circuit. A specific setting manner of the pixel circuit 12 is not limited in the embodiment of the present disclosure. In FIG. 3, the pixel circuit including the "7T1C" pixel circuit is only used as an example for the illustration. As shown in FIG. 3, the pixel circuit 12 includes a first light emission control transistor M1, a data signal writing transistor M2, the drive transistor M3, a threshold compensation transistor M4, the initialization transistor M5, a second light emission control transistor M6, a reset transistor M7, and a storage capacitor Cst. An operation process of the pixel circuit 12 may include an initialization stage, a data signal writing stage, and a light emission stage. In an embodiment, in the initialization stage, a signal input to a first scan signal terminal Scan1 is an enable signal, and signals input to a second scan signal terminal Scan2 and a light emission control signal terminal Emit are non-enable signals. In this case, the initialization transistor M5 is turned on, and the initialization signal $V_{ref}$ on the initialization signal line 13 is written through the initialization transistor M5 into one capacitor substrate in the storage capacitor Cst and the gate of the drive transistor M3, that is, a first node N1. In this case, a potential of the gate of the drive transistor M3 is also the initialization signal $V_{ref}$ which controls a conduction degree of the drive transistor M3. In the data signal writing stage, a signal input to the second scan signal terminal Scan2 is the enable signal, and signals input to the first scan signal terminal Scan1 and the light emission control signal terminal Emit are the non-enable signals. In this case, the data signal writing transistor M2 and the threshold compensation transistor M4 are turned on. At the same time, the potential of the gate of the drive transistor M3 is the initialization signal $V_{ref}$ which controls the drive transistor M3 to be turned on, too. A data signal input to a data signal input terminal Vdata is applied to the first node N1 through the data signal writing transistor M2, the drive transistor M3, and the threshold compensation transistor M4, and the potential of the first node N1 is gradually pulled up by the data signal. When a voltage of the gate of the drive transistor M3 is pulled up so that a voltage difference between the gate and source of the drive transistor M3 is less than or equal to a threshold voltage $V_{th}$ of the drive transistor M3, the drive transistor M3 will be in an off state. In this case, in a data signal voltage writing stage, the reset transistor M7 is also turned on, the reset transistor M7 writes the initialization signal $V_{ref}$ on the initialization signal line 13 into a first electrode (for example, the first electrode) of the light-emitting element 11, and a potential of the first electrode of the light-emitting element 11 is initialized so that the influence of a voltage of the first electrode of the light-emitting element 11 in a previous frame on a voltage of the first electrode of the light-emitting element 11 in a subsequent frame can be reduced and display uniformity can be further improved. In the light emission stage, a signal input to the light emission control signal terminal Emit is the enable signal, and signals input to the first scan signal terminal Scan1 and the second scan signal terminal Scan2 are the non-enable signals. In this case, the first light emission control transistor M1 and the second light emission control transistor M6 are turned on, and a drive current generated by the drive transistor M3 drives the light-emitting element 11 to emit the light. It can be seen from the description of the preceding operation process that when the initialization signals V re f are different, the drive transistor M3 has different initialization degrees. Thus, in the data signal writing stage, different data signals are written into the gate of the drive transistor M3. Further, in the light emission stage, voltage differences between the gate and source of the drive transistor are different, and the drive transistor M3 generates different drive currents to control the light-emitting element 11 to have different brightness.

It is to be noted that the illustration is performed in FIG. 3 by using an example in which transistors M1 to M7 are P-type transistors. Correspondingly, an enable signal corresponding to each transistor is a low-level signal. The transistors M1 to M7 may also be N-type transistors. In this case, the enable signal corresponding to each transistor is a high-level signal. The type of each transistor is not limited in the embodiment of the present disclosure. In addition, to prevent leakage currents of the threshold compensation transistor M4 and the initialization transistor M5 from influencing the potential of the gate of the drive transistor M3, the threshold compensation transistor M4 and the initialization transistor M5 may be further double-gate transistors or the N-type transistors (not shown in the figure) so as to ensure that the light-emitting element is not influenced by the leakage currents when emitting the light.

It can be seen from the preceding description that at the different drive frequencies, the display brightness of the display panel decreases at the inconsistent amplitudes, which results in the different display brightness of the display panel at the different drive frequencies. Referring to FIG. 1, it can be seen that the higher the drive frequency is, the higher the display brightness of the display panel is while the lower the drive frequency is, the lower the display brightness of the display panel is. Thus, in conjunction with the preceding influence of the initialization signal $V_{ref}$ on the brightness, the initialization signals $V_{ref}$ may be set different at the different drive frequencies so as to adjust the difference in the display brightness at the different drive frequencies. That is, different from the scheme that the initialization signal is the same at the different drive frequencies in the related art, the embodiment of the present disclosure creatively provides the initialization signal dynamically adjusted at the different drive frequencies, and the display brightness at the different drive frequencies is adjusted through the dynamically adjusted initialization signal, thereby reducing the difference in the display brightness of the display panel at the different drive frequencies and improving the display effect.

In an embodiment, the drive modes of the display panel 10 include at least the first drive mode, the second drive mode, and the third drive mode, where the first drive mode corresponds to the first drive frequency $F_1$ and the first initialization signal $V_{ref1}$, the second drive mode corresponds to the second drive frequency $F_2$ and a second initialization signal $V_{ref2}$, and the third drive mode corresponds to the third drive frequency $F_3$ and a third initialization signal $V_{ref3}$. The first drive frequency $F_1$ is higher than the second drive frequency $F_2$, the second drive frequency $F_2$ is higher than the third drive frequency $F_3$, and the first initialization signal $V_{ref1}$, the second initialization signal $V_{ref2}$, and the third initialization signal $V_{ref3}$ are different from each other, that is, $F_1>F_2>F_3$, and $V_{ref1}\neq V_{ref2}\neq V_{ref3}$. That is, the different drive frequencies correspond to the different initialization signals. Thus, the display brightness at the different drive frequencies is adjusted through the initialization signal which dynamically changes, thereby reducing the difference in the display brightness of the display panel at the different drive frequencies and improving the display effect. It is to be noted that the drive frequency here may be understood as a display refresh frequency of the display panel, that is, the number of frames of images displayed by the display panel per second. For example, $F_1$ may be 120 Hz, $F_2$ may be 60 Hz, and $F_3$ may be 30 Hz. Specific values of the first drive frequency $F_1$, the second drive frequency $F_2$, and the third drive frequency $F_3$ are not limited in the embodiment of the present disclosure.

Based on this, $$\frac{F_2 - F_3}{F_1 - F_3} \neq \frac{|V_{ref2} - V_{ref3}|}{|V_{ref1} - V_{ref3}|},$$

that is, the change degrees of the initialization signal are different from the change degrees of the drive frequency. Thus, the display brightness at the different drive frequencies is further adjusted through the initialization signal which dynamically changes, thereby reducing the difference in the display brightness of the display panel at the different drive frequencies and improving the display effect.

For example, as shown in FIGS. 4 and 5, FIG. 4 corresponds to the case where the transistors in FIG. 3 are the P-type transistors, and in FIG. 5, curve 3 shows changes in the display brightness of the display panel with time when the drive frequency is 120 Hz, and curve 4 shows changes in the display brightness of the display panel with time when the drive frequency is 40 Hz. Portions filled with oblique lines may show differences between the display brightness of the display panel when the drive frequency is 120 Hz and the display brightness of the display panel when the drive frequency is 40 Hz. In an embodiment, in FIG. 5, the left portion filled with the oblique lines may be understood as the case where the display brightness of the display panel when the drive frequency is 40 Hz is higher than the display brightness of the display panel when the drive frequency is 120 Hz, and the right portion filled with the oblique lines may be understood as the case where the display brightness of the display panel when the drive frequency is 120 Hz is higher than the display brightness of the display panel when the drive frequency is 40 Hz. Therefore, the different drive frequencies are set to correspond to the different initialization signals and the change degrees of the initialization signal are different from the change degrees of the drive frequency so that the difference in the display brightness in the different drive modes may be counteracted, thereby reducing or eliminating the difference in the display brightness of the display panel at the different drive frequencies and improving the display effect. For example, the different drive frequencies are set to correspond to the different initialization signals and the change degrees of the initialization signal are different from the change degrees of the drive frequency so that when the drive frequency decreases from 120 Hz to 60 Hz, the brightness of the display panel changes by 0.5%, when the drive frequency decreases from 120 Hz to 40 Hz, the brightness of the display panel changes by 0.5%, and when the drive frequency decreases from 120 Hz to 30 Hz, the brightness of the display panel changes by 0.5%. The change in the display brightness caused by the change in the drive frequency in the case where the initialization signal is dynamically adjusted is much smaller than the change in the display brightness caused by the change in the drive frequency in the case where the initialization signal remains unchanged in the related art.

In summary, in the display panel provided by the embodiment of the present disclosure, the initialization signals are set different in the different drive modes so as to adjust the difference in the display brightness in the different drive modes, and the change degrees of the drive frequency are set different from the change degrees of the initialization signal in the different drive modes so as to further adjust the display brightness in the different drive modes, thereby reducing the difference in the display brightness of the display panel at the different drive frequencies and improving the display effect.

Based on the preceding embodiment, the drive transistor includes a P-type transistor, and in this case, $V_{ref3}<V_{ref2}<V_{ref1}<0$; or the drive transistor includes an N-type transistor, and in this case, $V_{ref3}>V_{ref2}>V_{ref1}>0$.

For example, if the drive transistor includes the P-type transistor, an enable signal which controls the drive transistor to be turned on is the low-level signal. In this case, $V_{ref3}<V_{ref2}<V_{ref1}<0$. That is, the lower the drive frequency is, the smaller the initialization signal is. The data signal needs to be pulled up from a lower potential in a data writing stage. The lower the potential of the gate of the drive transistor after the data writing stage, in the light emission stage, the greater the voltage difference between the source and gate of the drive transistor, the greater the drive current, and the higher the brightness of the display panel. Thus, the initialization signal is dynamically adjusted at the different drive frequencies so that the adjustment of the display panel is implemented, thereby reducing or eliminating the difference in the display brightness when the display panel switches between the different drive frequencies and improving the display effect.

Similarly, if the drive transistor includes the N-type transistor, the enable signal which controls the drive transistor to be turned on is the high-level signal. In this case, $V_{ref3}>V_{ref2}>V_{ref1}>0$. That is, the lower the drive frequency is, the greater the initialization signal is. The data signal needs to be pulled up from a higher potential in the data writing stage. The higher the potential of the gate of the drive transistor after the data writing stage ends, in the light emission stage, the greater the voltage difference between the gate and source of the drive transistor, the greater the drive current, and the higher the brightness of the display panel. Thus, the initialization signal is dynamically adjusted at the different drive frequencies so that the adjustment of the display panel is implemented, thereby reducing or eliminating the difference in the display brightness when the display panel switches between the different drive frequencies and improving the display effect.

In an embodiment, $$\frac{F_2-F_3}{F_1-F_3}<\frac{|V_{ref2}-V_{ref3}|}{|V_{ref1}-V_{ref3}|}.$$

It can be seen from the preceding description that the initialization signal influences an initialization degree of the drive transistor and thus influences the data signals written into the gate of the drive transistor. Further, in the light emission stage, the drive current generated by the drive transistor is influenced so as to influence the brightness of the light-emitting element. That is, the initialization signal is an indirect influence factor of the brightness. Therefore, the change degrees of the initialization signal are set larger than the change degrees of the drive frequency, that is, $$\frac{F_2-F_3}{F_1-F_3}<\frac{|V_{ref2}-V_{ref3}|}{|V_{ref1}-V_{ref3}|}.$$

Thus, it is ensured that adjustments of the display brightness by the initialization signal can be matched with the change degrees of the drive frequency, that is, the brightness of the display panel at the different drive frequencies can be better adjusted so as to reduce or eliminate the difference in the display brightness when the display panel switches between the different drive frequencies and improve the display effect.

In an embodiment, $|V_{ref2}-V_{ref3}|>|V_{ref1}-V_{ref2}|$.

In an embodiment, the lower the drive frequency of the display panel is, the longer a time interval between display signals of two adjacent frames is, that is, the longer the duration of a light emission holding stage is. However, in the light emission holding stage, charges stored in the storage capacitor need to maintain the potential of the gate of the drive transistor, and the amount of charges stored in the storage capacitor is constantly reduced. Therefore, the lower the drive frequency of the display panel is, the greater the attenuation of the display brightness is. This conclusion may also be obtained from the curves, as shown in FIG. 1, showing the changes in the display brightness of the display panel with time when the drive frequencies are 120 Hz and 40 Hz. Based on this, $|V_{ref2}-V_{ref3}|>|V_{ref1}-V_{ref2}|$. That is, the lower the drive frequency of the display panel is, the more the change trend of the initialization signal increases. Thus, the change trend of the initialization signal is matched with change trends of the drive frequency and the display brightness of the display panel. Thus, it is ensured that the magnitude of the initialization signal is adjusted so that the difference in the display brightness at the different drive frequencies can be made up, so as to reduce or eliminate the difference in the display brightness when the display panel switches between the different drive frequencies and improve the display effect.

Figure 6:
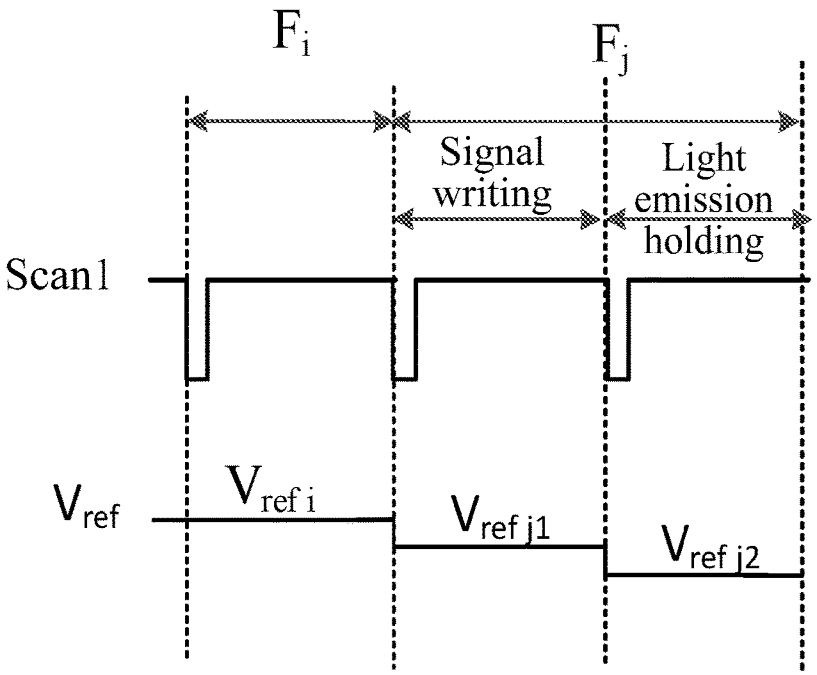
FIG. 6 is a drive timing diagram of another pixel circuit according to an embodiment of the present disclosure.
Figure 7:
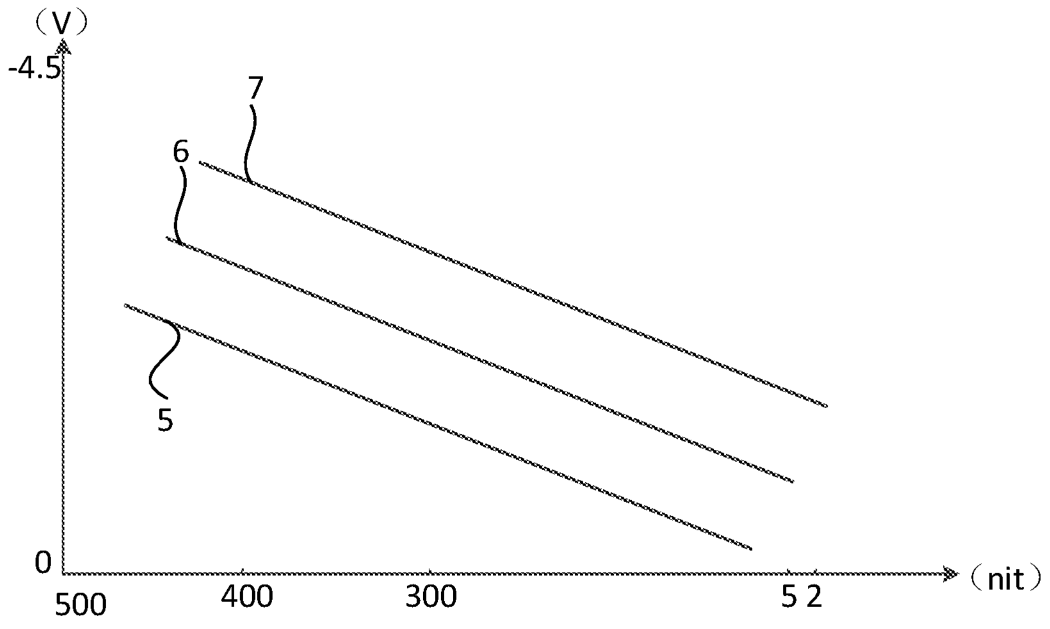
FIG. 7 is a schematic diagram showing correspondence between initialization signals and display brightness according to an embodiment of the present disclosure.

In an embodiment, FIG. 6 is a drive timing diagram of another pixel circuit according to an embodiment of the present disclosure. FIG. 7 is a schematic diagram showing correspondence between initialization signals and display brightness according to an embodiment of the present disclosure. In FIG. 7, curve 5 denotes an initialization signal corresponding to a drive frequency $F_i$, curve 6 denotes an initialization signal corresponding to a signal writing stage of a drive frequency $F_i$, and curve 7 denotes an initialization signal corresponding to a light emission holding stage of the drive frequency $F_j$. As shown in FIGS. 6 and 7, the drive modes of the display panel include an i-th drive mode and a j-th drive mode, and the j-th drive mode includes the signal writing stage and the light emission holding stage, where i and j are both integers and i≠j. The i-th drive mode corresponds to the i-th drive frequency $F_i$ and an i-th initialization signal $V_{refi}$, the j-th drive mode corresponds to the j-th drive frequency $F_j$, the signal writing stage in the j-th drive mode corresponds to a j1-th initialization signal $V_{refj1}$, and the light emission holding stage in the j-th drive mode corresponds to a j2-th initialization signal $V_{refj2}$, where $F_j<F_i$, and $|V_{refj2}|>|V_{refj1}|>|V_{refi}|$.

In an embodiment, if the drive transistor includes the P-type transistor, when the j-th drive frequency corresponding to the j-th drive mode is lower than the i-th drive frequency corresponding to the i-th drive mode, that is, $F_j<F_i$, the initialization signal in the j-th drive mode is controlled to be smaller than the initialization signal corresponding to the i-th drive mode, that is, $V_{refj}$ ($V_{refj1}$ and $V_{refj2}$)$<V_{refi}<0$. As shown in FIGS. 6 and 7, in this case, it can be ensured that a brightness difference between the j-th drive mode and the i-th drive mode is relatively small. Similarly, if the drive transistor includes the N-type transistor, when the j-th drive frequency corresponding to the j-th drive mode is lower than the i-th drive frequency corresponding to the i-th drive mode, that is, $F_j<F_i$, the initialization signal in the j-th drive mode is controlled to be greater than the initialization signal corresponding to the i-th drive mode, that is, $V_{refj}$ ($V_{refj1}$ and $V_{refj2}$)>$V_{refi}$>0 (not shown in the figure). In this case, it can be ensured that the brightness difference between the j-th drive mode and the i-th drive mode is relatively small.

Further, different from a drive mode having a relatively high drive frequency, a drive mode having a relatively low drive frequency includes the signal writing stage and the light emission holding stage. In the light emission holding stage, since no signal is written and the amount of charges stored in the storage capacitor is constantly reduced, the display brightness in the light emission stage is generally lower than the brightness in the signal writing stage. Based on this, the embodiment of the present disclosure creatively sets the absolute value of the initialization signal corresponding to the light emission holding stage relatively large in the drive mode having the relatively low drive frequency. That is, the i-th initialization signal $V_{refi}$ corresponding to the i-th drive mode, the j1-th initialization signal $V_{refj1}$ corresponding to the signal writing stage in the j-th drive mode, and the j2-th initialization signal $V_{refj2}$ corresponding to the light emission holding stage in the j-th drive mode satisfy that: $|V_{refj2}|>|V_{refj1}|>|V_{refi}|$. As shown in FIGS. 6 and 7, that is, in the drive mode having the relatively low drive frequency, the initialization signals are set different in the different stages and the initialization signals are set different at the different drive frequencies so as to adjust the display brightness, thereby reducing or eliminating the difference in the display brightness when the display panel switches between the different drive frequencies and improving the display effect.

It is to be noted that the illustration is performed in FIG. 6 by using an example in which the relatively high drive frequency is twice the relatively low drive frequency and the initialization signal $V_{ref}$ is smaller than 0. It is to be understood that specific values of the relatively high drive frequency and the relatively low drive frequency and a specific multiplication relationship between the relatively high drive frequency and the relatively low drive frequency are not limited in the embodiment of the present disclosure. Whether the initialization signal is positive or negative depends on the type of the drive transistor and is not limited in the embodiment of the present disclosure. The details are not repeated here.

In an embodiment, the drive modes of the display panel include a k-th drive mode and an l-th drive mode, and the k-th drive mode is a dominant-frequency drive mode. The k-th drive mode corresponds to a k-th drive frequency $F_k$ and a k-th initialization signal $V_{refk}$, and the l-th drive mode corresponds to an l-th drive frequency $F_l$ and an l-th initialization signal $V_{refl}$, where $F_l<F_k$, $F_k$ is an integral multiple of $F_l$, and $$|V_{refk} - V_{ref1}| = \left(\frac{F_k}{F_l} - 1\right) \times 0.1.$$

For example, the k-th drive mode is the dominant-frequency drive mode. Here, the dominant-frequency drive mode may be understood as a drive mode which is matched with an operation frequency of a driver chip in the display panel. Alternatively, here, the dominant-frequency drive mode may be understood as a drive frequency corresponding to the display panel in a normal display process, and other drive modes are the reduced-frequency drive modes obtained according to display requirement (for example, reducing power consumption) based on a normal drive mode. Alternatively, here, the dominant-frequency drive mode may be understood as a drive mode corresponding to a highest drive frequency, that is, the k-th drive frequency $F_k$ is the highest drive frequency of the display panel, and the other drive modes are the reduced-frequency drive modes obtained according to the display requirement (for example, reducing the power consumption) based on the dominant-frequency drive mode, that is, the l-th drive frequency $F_l$ is a reduced drive frequency based on the highest drive frequency $F_k$. In an embodiment, the drive frequency and the initialization signal corresponding to the dominant-frequency drive mode and the drive frequency and the initialization signal corresponding to the reduced-frequency drive mode are set to satisfy that:

$$|V_{refk} - V_{ref1}| = \left(\frac{F_k}{F_l} - 1\right) \times 0.1.$$

That is, a correspondence relationship between the drive frequencies and the initialization signals is properly set and it is ensured that the initialization signal is adjusted according to the preceding correspondence relationship at the different drive frequencies, thereby ensuring that the difference in the display brightness of the display panel at the different drive frequencies is reduced or eliminated and the display effect is improved. For example, when $F_k$=120 Hz and $F_l$=60 Hz, $|V_{refk}-V_{refl}|$=0.1 V; when $F_k$=120 Hz and $F_l$=40 Hz, $|V_{refk}-V_{refl}|$=0.2 V; and when $F_k$=120 Hz and $F_l$=30 Hz, $|V_{refk}-V_{refl}|$=0.3 V. It has been verified that when the drive frequency and the initialization signal corresponding to the dominant-frequency drive mode and the drive frequency and the initialization signal corresponding to the reduced-frequency drive mode satisfy that:

$$|V_{refk} - V_{ref1}| = \left(\frac{F_k}{F_l} - 1\right) \times 0.1,$$

the difference in the display brightness between the different drive frequencies is within 1%, thereby ensuring that the difference in the display brightness of the display panel at the different drive frequencies is reduced or eliminated and the display effect is improved.

In an embodiment, the drive modes of the display panel include an s-th drive mode and a w-th drive mode, and the w-th drive mode is the highest-frequency drive mode. The s-th drive mode corresponds to an s-th drive frequency $F_s$ and an s-th initialization signal $V_{refs}$, and the w-th drive mode corresponds to a w-th drive frequency $F_w$ and a w-th initialization signal $V_{refw}$, where $$\frac{F_s - F_w}{F_s \times 30} \le |V_{refs} - V_{refw}| \le \frac{F_s - F_w}{F_s \times 10}.$$

For example, the w-th drive mode is the highest-frequency drive mode. Here, the highest-frequency drive mode may be understood as a drive mode corresponding to a highest refresh frequency of the display panel, and other drive modes are the reduced-frequency drive modes obtained according to the display requirement (for example, reducing the power consumption) based on the highest-frequency drive mode, that is, the s-th drive frequency $F_s$ of the s-th drive mode is a reduced drive frequency based on the highest drive frequency $F_w$. In an embodiment, the drive frequency and the initialization signal corresponding to the highest-frequency drive mode and the drive frequency and the initialization signal corresponding to the reduced-frequency drive mode are set to satisfy that:

$$\frac{F_w - F_s}{F_s \times 30} \leq |V_{refs} - V_{refw}| \leq \frac{F_w - F_s}{F_s \times 10}.$$

That is, the correspondence relationship between the drive frequencies and the initialization signals is properly set and it is ensured that the initialization signal is adjusted according to the preceding correspondence relationship at the different drive frequencies, thereby ensuring that the difference in the display brightness of the display panel at the different drive frequencies is reduced or eliminated and the display effect is improved. For example, when $F_w$=120 Hz and $F_s$=60 Hz, $1/30 \leq |V_{refs} - V_{refw}| \leq 0.1$ V; when $F_w$=120 Hz and $F_s$=40 Hz, $2/30 \leq |V_{refs} - V_{refw}| \leq 0.2$ V; and when $F_w$=120 Hz and $F_s$=30 Hz, $0.1\ V \leq |V_{refs} - V_{refw}| \leq 0.3$ V. It has been verified that when the drive frequency and the initialization signal corresponding to the highest-frequency drive mode and the drive frequency and the initialization signal corresponding to the reduced-frequency drive mode satisfy that:

$$\frac{F_w - F_s}{F_s \times 30} \leq |V_{refs} - V_{refw}| \leq \frac{F_w - F_s}{F_s \times 10},$$

the difference in the display brightness between the different drive frequencies is within 1%, thereby ensuring that the difference in the display brightness of the display panel at the different drive frequencies is reduced or eliminated and the display effect is improved.

Figure 8:
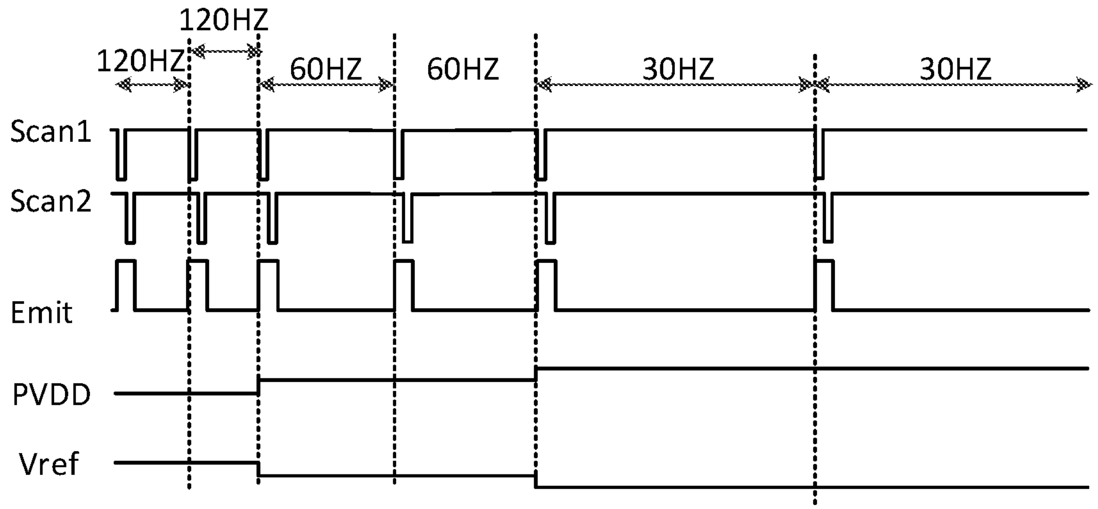
FIG. 8 is a drive timing diagram of another pixel circuit according to an embodiment of the present disclosure.

Based on the preceding embodiment, FIG. 8 is a drive timing diagram of another pixel circuit according to an embodiment of the present disclosure. Referring to FIGS. 3 and 8, the display panel provided by the embodiment of the present disclosure may further include a power signal line 14, where the power signal line 14 is electrically connected to the power signal terminal PVDD and configured to transmit a power signal to the power signal terminal PVDD. The first drive mode further corresponds to a first power signal $V_{dd1}$, the second drive mode further corresponds to a second power signal $V_{dd2}$, and the third drive mode further corresponds to a third power signal $V_{dd3}$, where $$\frac{F_2 - F_3}{F_1 - F_3} \neq \frac{|V_{dd2} - V_{dd3}|}{|V_{dd1} - V_{dd3}|}.$$

In an embodiment, in conjunction with the preceding operation process of the pixel circuit, it can be seen that when first power signals are different, different potentials are written into the source of the drive transistor M3. Thus, in the light emission stage, the voltage differences between the gate and source of the drive transistor are different, and the drive transistor M3 generates different drive currents to control the light-emitting element 11 to have the different brightness. In addition, the display brightness of the display panel decreases at the inconsistent amplitudes at the different drive frequencies, which results in the different display brightness of the display panel at the different drive frequencies. Referring to FIG. 1, it can be seen that the higher the drive frequency is, the higher the display brightness of the display panel is while the lower the drive frequency is, the lower the display brightness of the display panel is. Thus, in conjunction with the preceding influence of the first power signal on the brightness, the first power signals may be set different at the different drive frequencies so as to adjust the difference in the display brightness at the different drive frequencies. That is, different from the solution that the first power signal is the same at the different drive frequencies in the related art, the embodiment of the present disclosure creatively provides the dynamically adjusted first power signal at the different drive frequencies, and the display brightness at the different drive frequencies is adjusted through the dynamically adjusted first power signal, thereby reducing the difference in the display brightness of the display panel at the different drive frequencies and improving the display effect.

In an embodiment, the drive modes of the display panel 10 include at least the first drive mode, the second drive mode, and the third drive mode. The first drive mode corresponds to the first drive frequency $F_1$ and the first power signal $V_{dd1}$, the second drive mode corresponds to the second drive frequency $F_2$ and the second power signal $V_{dd2}$, and the third drive mode corresponds to the third drive frequency $F_3$ and the third power signal $V_{dd3}$, where $V_{dd1} \neq V_{dd2} \neq V_{dd3}$. That is, the different drive frequencies correspond to the different first power signals. Thus, the display brightness at the different drive frequencies is adjusted through the first power signal which dynamically changes, thereby reducing the difference in the display brightness of the display panel at the different drive frequencies and improving the display effect. Further, $$\frac{F_2 - F_3}{F_1 - F_3} \neq \frac{|V_{dd2} - V_{dd3}|}{|V_{dd1} - V_{dd3}|},$$

that is, change degrees of the first power signal are different from the change degrees of the drive frequency. Thus, the display brightness at the different drive frequencies is further adjusted through the first power signal which dynamically changes, thereby reducing the difference in the display brightness of the display panel at the different drive frequencies and improving the display effect.

Based on the preceding embodiment, the drive transistor includes the P-type transistor, and $V_{dd3} > V_{dd2} > V_{dd1} > 0$; or the drive transistor includes the N-type transistor, and $0 < V_{dd3} < V_{dd2} < V_{dd1}$.

For example, if the drive transistor includes the P-type transistor, the drive current generated by the drive transistor is positively correlated to the voltage difference between the source and gate of the drive transistor. In this case, $V_{dd3} > V_{dd2} > V_{dd1} > 0$. That is, the lower the drive frequency is, the greater the first power signal is. In the light emission stage, the higher the potential of the source of the drive transistor is, the greater the voltage difference between the source and gate of the drive transistor is, the greater the drive current is, and the higher the brightness of the display panel is. Thus, the first power signal is dynamically adjusted at the different drive frequencies so that the adjustment of the display panel is implemented, thereby reducing or eliminating the difference in the display brightness when the display panel switches between the different drive frequencies and improving the display effect.

Similarly, if the drive transistor includes the N-type transistor, the drive current generated by the drive transistor is positively correlated to the voltage difference between the gate and source of the drive transistor. In this case, $0<V_{dd3}<V_{dd2}<V_{dd1}$. That is, the lower the drive frequency is, the smaller the first power signal is. In the light emission stage, the lower the potential of the source of the drive transistor is, the greater the voltage difference between the gate and source of the drive transistor is, the greater the drive current is, and the higher the brightness of the display panel is. Thus, the first power signal is dynamically adjusted at the different drive frequencies so that the adjustment of the display panel is implemented, thereby reducing or eliminating the difference in the display brightness when the display panel switches between the different drive frequencies and improving the display effect.

In an embodiment, $$\frac{F_2 - F_3}{F_1 - F_3} < \frac{|V_{dd2} - V_{dd3}|}{|V_{dd1} - V_{dd3}|}.$$

It can be seen from the preceding description that the first power signal influences the voltage difference between the gate and source of the drive transistor. Further, in the light emission stage, the drive current generated by the drive transistor is influenced so as to influence the brightness of the light-emitting element. That is, the first power signal is the indirect influence factor of the brightness. Therefore, the change degrees of the first power signal are set larger than the change degrees of the drive frequency, that is, $$\frac{F_2 - F_3}{F_1 - F_3} < \frac{|V_{ref2} - V_{ref3}|}{|V_{ref1} - V_{ref3}|}.$$

Thus, it is ensured that adjustments of the display brightness by the first power signal can be matched with the change degrees of the drive frequency, that is, the brightness of the display panel at the different drive frequencies can be better adjusted so as to reduce or eliminate the difference in the display brightness when the display panel switches between the different drive frequencies and improve the display effect.

In an embodiment, $|V_{dd2}-V_{dd3}|>|V_{dd1}-V_{dd2}|$.

In an embodiment, the lower the drive frequency of the display panel is, the longer the time interval between the two adjacent frames of display signals is, that is, the longer the duration of the light emission holding stage is. However, in the light emission holding stage, the charges stored in the storage capacitor need to maintain the potential of the gate of the drive transistor, and the amount of charges stored in the storage capacitor is constantly reduced. Therefore, the lower the drive frequency of the display panel is, the greater the attenuation of the display brightness is. This conclusion may also be obtained from the curves, as shown in FIG. 1, showing the changes in the display brightness of the display panel with time when the drive frequencies are 120 Hz and 40 Hz. Based on this, $|V_{dd2}-V_{dd3}|>|V_{dd1}-V_{dd2}|$. That is, the lower the drive frequency of the display panel is, the more the change trend of the first power signal increases. Thus, the change trend of the first power signal is matched with the change trends of the drive frequency and the display brightness of the display panel. Thus, it is ensured that the magnitude of the first power signal is adjusted so that the difference in the display brightness at the different drive frequencies can be compensated, so as to reduce or eliminate the difference in the display brightness when the display panel switches between the different drive frequencies and improve the display effect.

Figure 9:
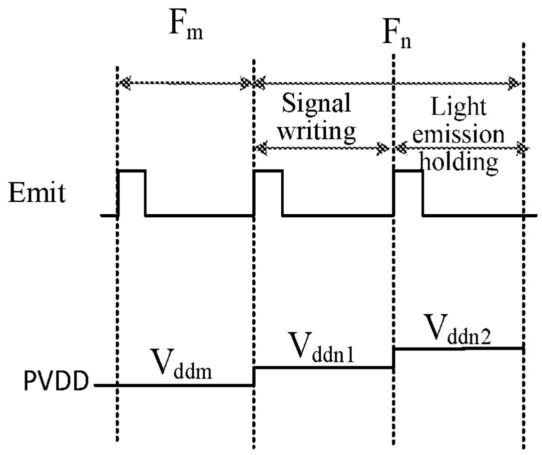
FIG. 9 is a drive timing diagram of another pixel circuit according to an embodiment of the present disclosure.

In an embodiment, FIG. 9 is a drive timing diagram of another pixel circuit according to an embodiment of the present disclosure. As shown in FIG. 9, the drive modes of the display panel include an m-th drive mode and an n-th drive mode, and the n-th drive mode includes the signal writing stage and the light emission holding stage, where m and n are both the integers and m≠n. The m-th drive mode corresponds to an m-th drive frequency $F_m$ and an m-th power signal $V_{ddm}$, the n-th drive mode corresponds to an n-th drive frequency $F_n$, the signal writing stage in the n-th drive mode corresponds to an n1-th initialization signal $V_{ddn1}$, and the light emission holding stage in the n-th drive mode corresponds to an n2-th initialization signal $V_{ddn2}$, where $F_n<F_m$. The drive transistor includes the P-type transistor, and $V_{ddn2}>V_{ddn1}>V_{ddm}>0$; or the drive transistor includes the N-type transistor, and $0<V_{ddn2}<V_{ddn1}<V_{ddm}$.

In an embodiment, if the drive transistor includes the P-type transistor, when the n-th drive frequency corresponding to the n-th drive mode is lower than the m-th drive frequency corresponding to the m-th drive mode, that is, $F_n<F_m$, the first power signal in the n-th drive mode is controlled to be greater than the first power signal corresponding to the m-th drive mode, that is, $V_{ddn}>V_{ddm}>0$. As shown in FIG. 9, in this case, it can be ensured that a brightness difference between the n-th drive mode and the m-th drive mode is relatively small. Similarly, if the drive transistor includes the N-type transistor, when the n-th drive frequency corresponding to the n-th drive mode is lower than the m-th drive frequency corresponding to the m-th drive mode, that is, $F_n<F_m$, the first power signal in the n-th drive mode is controlled to be smaller than the first power signal corresponding to the m-th drive mode, that is, $0<V_{ddn}<V_{ddm}$ (not shown in the figure). In this case, it can be ensured that the brightness difference between the n-th drive mode and the m-th drive mode is relatively small.

Further, different from the drive mode having the relatively high drive frequency, the drive mode having the relatively low drive frequency includes the signal writing stage and the light emission holding stage. In the light emission holding stage, since no signal is written and the amount of charges stored in the storage capacitor is constantly reduced, the display brightness in the light emission stage is generally lower than the brightness in the signal writing stage. Based on this, the embodiment of the present disclosure creatively sets the first power signal corresponding to the light emission holding stage to be relatively greater in the drive mode having the relatively low drive frequency if the drive transistor is the P-type transistor. That is, an m-th first power signal $V_{ddm}$ corresponding to the m-th drive mode, an n1-th first power signal $V_{ddn1}$ corresponding to the signal writing stage in the n-th drive mode, and an n2-th first power signal $V_{ddn2}$ corresponding to the light emission holding stage in the n-th drive mode satisfy that: $V_{ddn2}>V_{ddn1}>V_{ddm}>0$. As shown in FIG. 9, thus, the voltage difference between the source and gate of the drive transistor is adjusted so that the adjustment of the brightness is implemented. Alternatively, if the drive transistor is the N-type transistor, the first power signal corresponding to the light emission holding stage is relatively small. That is, the m-th first power signal $V_{ddm}$ corresponding to the m-th drive mode, the n1-th first power signal $V_{ddn1}$ corresponding to the signal writing stage in the n-th drive mode, and the n2-th first power signal $V_{ddn2}$ corresponding to the light emission holding stage in the n-th drive mode satisfy that: $0<V_{ddn2}<V_{ddn1}<V_{ddm}$. Thus, the voltage difference between the gate and source of the drive transistor is adjusted so that the adjustment of the brightness is implemented. In general, for the two drive modes having the different drive frequencies, in the drive mode having the relatively low drive frequency, the first power signals are set different in the different stages and the first power signals are set different at the different drive frequencies so as to adjust the display brightness, thereby reducing or eliminating the difference in the display brightness when the display panel switches between the different drive frequencies and improving the display effect.

It is to be noted that the illustration is performed in FIG. 9 by using an example in which the relatively high drive frequency is twice the relatively low drive frequency. It is to be understood that the specific values of the relatively high drive frequency and the relatively low drive frequency and the specific multiplication relationship between the relatively high drive frequency and the relatively low drive frequency are not limited in the embodiment of the present disclosure.

Based on the preceding embodiment, $$\frac{|V_{ref2}-V_{ref3}|}{|V_{ref1}-V_{ref3}|} > \frac{|V_{dd2}-V_{dd3}|}{|V_{dd1}-V_{dd3}|}.$$

In an embodiment, the initialization signal influences the initialization degree of the drive transistor and thus influences the data signals written into the gate of the drive transistor. Further, the voltage difference between the gate and source of the drive transistor is influenced. Finally, in the light emission stage, the drive current generated by the drive transistor is influenced so as to influence the brightness of the light-emitting element. The first power signal influences the voltage difference between the gate and source of the drive transistor. Further, in the light emission stage, the drive current generated by the drive transistor is influenced so as to influence the brightness of the light-emitting element. In summary, the first power signal has a more direct influence on the brightness of the light-emitting element, and the initialization signal has a more indirect influence on the brightness of the light-emitting element than the first power signal. Therefore, to adjust the brightness, the change degrees of the initialization signal may be set larger than the change degrees of the first power signal, that is, $$\frac{|V_{ref2}-V_{ref3}|}{|V_{ref1}-V_{ref3}|} > \frac{|V_{dd2}-V_{dd3}|}{|V_{dd1}-V_{dd3}|}.$$

Thus, it is ensured that the initialization signal and the first power signal are dynamically adjusted in a proper manner, thereby reducing or eliminating the difference in the display brightness when the display panel switches between the different drive frequencies and improving the display effect.

Based on the preceding embodiment, $||V_{dd1}|-|V_{ref1}|| > ||V_{dd2}|-|V_{ref2}|| > ||V_{dd3}|-|V_{ref3}||$.

As described above, the first power signal has the more direct influence on the brightness of the light-emitting element, and the initialization signal has the more indirect influence on the brightness of the light-emitting element than the first power signal. Therefore, to ensure the adjustment of the display brightness at the different drive frequencies, the change degrees of the first power signal may be set smaller than the change degrees of the initialization signal. That is, as the drive frequency decreases, a difference between absolute values of the first power signal and the initialization signal is gradually reduced, that is, $||V_{dd1}|-|V_{ref1}|| > ||V_{dd2}|-|V_{ref2}|| > ||V_{dd3}|-|V_{ref3}||$. Thus, it is ensured that the initialization signal and the first power signal are dynamically adjusted in the proper manner, thereby reducing or eliminating the difference in the display brightness when the display panel switches between the different drive frequencies and improving the display effect.

Based on the preceding embodiment, the drive modes of the display panel include a p-th drive mode and a q-th drive mode, and the q-th drive mode is the dominant-frequency drive mode, where p and q are both the integers and p≠q. The p-th drive mode corresponds to a p-th drive frequency $F_p$, a p-th initialization signal $V_{refp}$, and a p-th power signal $V_{ddp}$, and the q-th drive mode corresponds to a q-th drive frequency $F_q$, a q-th initialization signal $V_{refq}$, and a q-th power signal $V_{ddq}$. The drive transistor includes the P-type transistor, and $$(V_{ddp}-V_{refp}) = (V_{ddq}-V_{refq}) + \left(\frac{F_q}{F_p}-1\right)\times 0.1;$$

or the drive transistor includes the N-type transistor, and $$(V_{refp}-V_{ddp}) = (V_{refq}-V_{ddq}) + \left(\frac{F_q}{F_p}-1\right)\times 0.1,$$

where $F_q$ is the integral multiple of $F_p$.

For example, the q-th drive mode is the dominant-frequency drive mode. Here, the dominant-frequency drive mode may be understood as the drive mode which is matched with the operation frequency of the driver chip in the display panel. Alternatively, here, the dominant-frequency drive mode may be understood as the drive frequency corresponding to the display panel in the normal display process, and the other drive modes are the reduced-frequency drive modes obtained according to the display requirement (for example, reducing the power consumption) based on the normal drive mode. Alternatively, here, the dominant-frequency drive mode may be understood as the drive mode corresponding to the highest drive frequency, that is, the q-th drive frequency $F_q$ is the highest drive frequency of the display panel, and the other drive modes are the reduced-frequency drive modes obtained according to the display requirement (for example, reducing the power consumption) based on the dominant-frequency drive mode, that is, the p-th drive frequency $F_p$ is a reduced drive frequency of the p-th drive mode based on the highest drive frequency $F_q$. In an embodiment, when the drive transistor is the P-type transistor, a potential of the first power signal is higher than a potential of the initialization signal; and the drive frequency, the initialization signal, and the first power signal corresponding to the dominant-frequency drive mode and the drive frequency, the initialization signal, and the first power signal corresponding to the reduced-frequency drive mode may be set to satisfy that:

$$(V_{ddp}-V_{refp}) = (V_{ddq}-V_{refq}) + \left(\frac{F_q}{F_p}-1\right)\times 0.1.$$

When the drive transistor is the N-type transistor, the potential of the first initialization signal is higher than the potential of the first power signal; and the drive frequency, the initialization signal, and the first power signal corresponding to the dominant-frequency drive mode and the drive frequency, the initialization signal, and the first power signal corresponding to the reduced-frequency drive mode may be set to satisfy:

$$(V_{refp} - V_{ddp}) = (V_{refq} - V_{ddq}) + \left(\frac{F_q}{F_p} - 1\right) \times 0.1.$$

That is, the correspondence relationship between the drive frequencies and the initialization signals is properly set and it is ensured that the initialization signal and the first power signal are adjusted according to the preceding correspondence relationship at the different drive frequencies, thereby ensuring that the difference in the display brightness of the display panel at the different drive frequencies can be reduced or eliminated and the display effect can be improved. For example, when $F_q$=120 Hz and $F_p$=60 Hz, $(V_{ddp}-V_{refp})=(V_{ddq}-V_{refq})+0.1$ V, or $(V_{refp}-V_{ddp})=(V_{refq}-V_{ddq})+0.1$ V; when $F_q$=120 Hz and $F_{p=}$40 Hz, $(V_{ddp}-V_{refp})=(V_{ddq}-V_{refq})+0.2$ V, or $(V_{refp}-V_{ddp})=(V_{refq}-V_{ddq})+0.2$ V; and when $F_q$=120 Hz and $F_{pb=30}$ Hz, $(V_{ddp}-V_{refp})=(V_{ddq}-V_{refq})+0.3$ V, or $(V_{refp}-V_{ddp})=(V_{refq}-V_{ddq})+0.1$ V. It has been verified that when the drive frequency, the initialization signal, and the first power signal corresponding to the dominant-frequency drive mode and the drive frequency, the initialization signal, and the first power signal corresponding to the reduced-frequency drive mode satisfy the preceding limitations, the difference in the display brightness between the different drive frequencies is within 1%, thereby ensuring that the difference in the display brightness of the display panel at the different drive frequencies is reduced or eliminated and the display effect is improved.

In an embodiment, with continued reference to FIG. 3, the pixel circuit 12 provided by the embodiment of the present disclosure further includes the reset transistor M7 and a reset signal terminal VREF2. The reset signal terminal VREF2 is electrically connected to the initialization signal line 13 and a first terminal of the reset transistor M7 separately, and a second terminal of the reset transistor M7 is electrically connected to the first terminal of the light-emitting element 11. The initialization signal line 13 is configured to provide signals for the initialization signal terminal VREF1 and the reset signal terminal VREF2 in a time-division multiplexing manner, and the reset signal terminal VREF2 receives the same signal in the different drive modes.

In an embodiment, the pixel circuit 12 provided by the embodiment of the present disclosure may further include the reset transistor M7. The reset transistor M7 is configured to provide a reset signal for the first electrode (for example, the first electrode) of the light-emitting element 11, which can reduce the influence of the voltage of the first electrode of the light-emitting element 11 in the previous frame on the voltage of the first electrode of the light-emitting element 11 in the subsequent frame. In an embodiment, the reset signal terminal VREF2 and the initialization signal terminal VREF1 are the same signal terminal and electrically connected to the same initialization signal line 13. A potential of the reset signal transmitted by the reset signal terminal VREF2 is different from the potential of the initialization signal transmitted by the initialization signal terminal VREF1; therefore, in conjunction with enable signals of control terminals of the initialization transistor M5 and the reset transistor M7, the initialization signal line 13 may provide different initialization signals/reset signals for the initialization transistor M5 and the reset transistor M7 in the time-division multiplexing manner so as to initialize/reset the gate of the drive transistor M5 and the first electrode of the light-emitting element 11 in the time-division multiplexing manner. Further, although the initialization signal terminal VREF1 receives different initialization signals in different drive modes and the brightness at different drive frequencies is adjusted through the initialization signals, the reset signal terminal VREF2 receives the same signal in the different drive modes. That is, the change in the drive frequency will not influence reset received by the reset signal terminal VREF2, or the change in the initialization signal will not influence the reset received by the reset signal terminal VREF2, which ensures that the first electrode of the light-emitting element 11 receives the same reset signal at the different drive frequencies and has the same reset effect and the same light emission effect.

It is to be noted that the illustration is performed in FIG. 3 by using only an example in which the initialization transistor M5 and the reset transistor M7 are connected to the same initialization signal terminal. In this case, the initialization signal terminal may provide the different initialization signals (the reset signals) in the time-division multiplexing manner. In an embodiment, the initialization transistor M5 and the reset transistor M7 may be connected to different initialization signal terminals (not shown in the figure). The different initialization signal terminals provide corresponding initialization signals and reset signals respectively, thereby implementing the initialization of the drive transistor M3 and the reset of the first electrode of the light-emitting element 11. In this case, the change in the drive frequency will not influence the reset received by the reset signal terminal, or the change in the initialization signal will not influence the reset received by the reset signal terminal, which ensures that the first electrode of the light-emitting element receives the same reset signal at the different drive frequencies and has the same reset effect.

Figure 10:
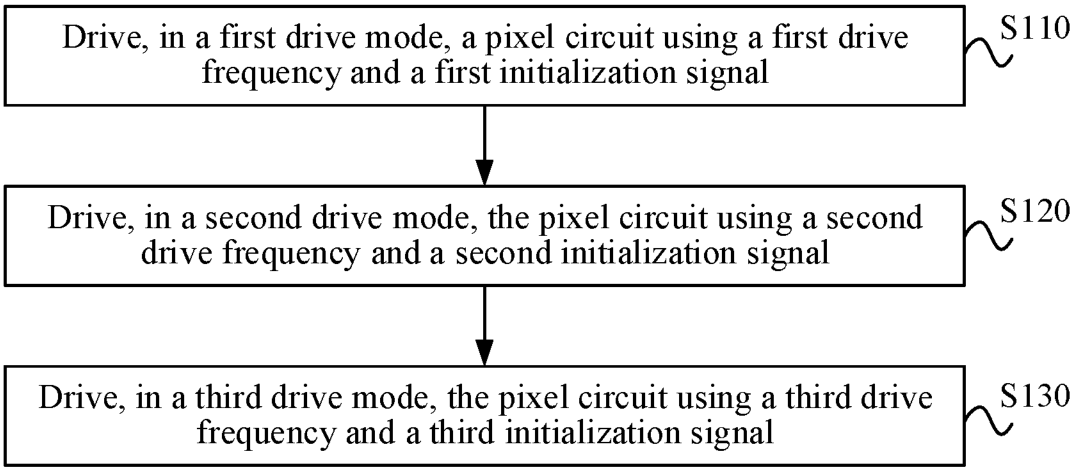
FIG. 10 is a flowchart of a driving method of a pixel circuit according to an embodiment of the present disclosure.

Based on the same inventive concept, the embodiment of the present disclosure further provides a driving method of a display panel. The driving method is applied for driving the display panel according to any one of the preceding embodiments. In an embodiment, FIG. 10 is a flowchart of a driving method of a display panel according to an embodiment of the present disclosure. As shown in FIG. 10, the driving method of the display panel provided by the embodiment of the present disclosure includes the steps described below.

In S110, a pixel circuit is driven using a first drive frequency and a first initialization signal in a first drive mode.

In S120, the pixel circuit is driven using a second drive frequency and a second initialization signal in a second drive mode.

In S130, the pixel circuit is driven using a third drive frequency and a third initialization signal in a third drive mode.

The first drive frequency $F_1$, the first initialization signal $V_{ref1}$, the second drive frequency $F_2$, the second initialization signal $V_{ref2}$, the third drive frequency $F_3$, and the third initialization signal $V_{ref3}$ satisfy that: $F_1>F_2>F_3$, $V_{ref1} \neq V_{ref2} \neq V_{ref3}$, and $$\frac{F_2 - F_3}{F_1 - F_3} \neq \frac{|V_{ref2} - V_{ref3}|}{|V_{ref1} - V_{ref3}|}.$$

In an embodiment, at different drive frequencies, display brightness of the display panel decreases at inconsistent amplitudes, which results in different display brightness of the display panel at the different drive frequencies. In addition, since initialization signals are different, a drive transistor has different initialization degrees. Further, in a data signal writing stage, different data signals are written into a gate of the drive transistor. Thus, in a light emission stage, voltage differences between the gate and source of the drive transistor are different, and the drive transistor generates different drive currents to control a light-emitting element to have different brightness. Therefore, different from the scheme that the initialization signal is the same at the different drive frequencies in the related art, the embodiment of the present disclosure creatively provides an initialization signal dynamically adjusted at the different drive frequencies, and the display brightness at the different drive frequencies is adjusted through the dynamically adjusted initialization signal, thereby reducing a difference in the display brightness of the display panel at the different drive frequencies and improving a display effect.

In an embodiment, the pixel circuit is driven using the first drive frequency and the first initialization signal in the first drive mode, the pixel circuit is driven using the second drive frequency and the second initialization signal in the second drive mode, and the pixel circuit is driven using the third drive frequency and the third initialization signal in the third drive mode, where $F_1>F_2>F_3$, and $V_{ref1}\neq V_{ref2}\neq V_{ref3}$. That is, the different drive frequencies correspond to the different initialization signals. Thus, the display brightness at the different drive frequencies is adjusted through the initialization signal which dynamically changes, thereby reducing the difference in the display brightness of the display panel at the different drive frequencies and improving the display effect. Based on this, $$\frac{F_2 - F_3}{F_1 - F_3} \neq \frac{|V_{ref2} - V_{ref3}|}{|V_{ref1} - V_{ref3}|},$$

that is, change degrees of the initialization signal are different from change degrees of the drive frequency. Thus, the display brightness at the different drive frequencies is further adjusted through the initialization signal which dynamically changes, thereby reducing the difference in the display brightness of the display panel at the different drive frequencies and improving the display effect.

In summary, according to the driving method provided by the embodiment of the present disclosure, the initialization signals are set different in the different drive modes so as to adjust the difference in the display brightness in the different drive modes, and further the change degrees of the drive frequency are set different from the change degrees of the initialization signal in the different drive modes so as to further adjust the display brightness in the different drive modes, thereby reducing the difference in the display brightness of the display panel at the different drive frequencies and improving the display effect.

Figure 11:
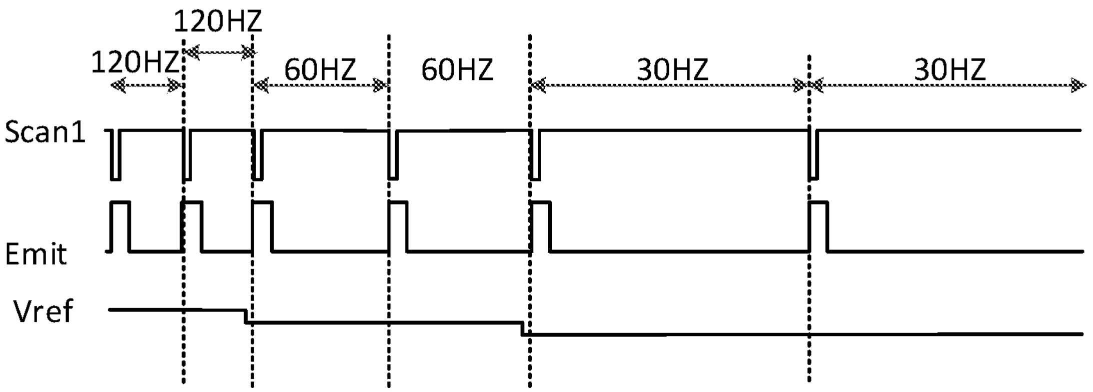
FIG. 11 is a drive timing diagram of another pixel circuit according to an embodiment of the present disclosure.

Based on the preceding embodiment, FIG. 11 is a drive timing diagram of another pixel circuit according to an embodiment of the present disclosure. As shown in FIG. 11, a gate of an initialization transistor is electrically connected to a scan signal input terminal. When the different drive modes are switched, a switching moment of the initialization signal $V_{ref}$ input to an initialization signal terminal is earlier than a switching moment of a scan signal Scan1 input to the scan signal input terminal; and a switching moment of the initialization signal $V_{ref}$ corresponding to a current drive mode is within an enable stage of a light emission control signal Emit corresponding to a previous drive mode.

For example, as shown in FIG. 11, when the different drive modes are switched, the switching moment of the initialization signal $V_{ref}$ input to the initialization signal terminal is earlier than the switching moment of the scan signal Scan1 input to the scan signal input terminal. Thus, it can be ensured that a stable initialization signal $V_{ref}$, instead of an initialization signal $V_{ref}$ which abruptly hops, can be input into the gate of the drive transistor in an entire enable stage of the scan signal Scan1, which ensures the writing stability of signals of first frames at the different drive frequencies. Further, the switching time of the initialization signal $V_{ref}$ corresponding to the current drive mode is within the enable stage of the light emission control signal Emit corresponding to the previous drive mode. In this case, the display panel still operates in the light emission stage of the previous drive mode so that the change in the initialization signal $V_{ref}$ will not influence a normal display in the previous drive mode, thereby ensuring that the display panel operates normally.

Figure 12:
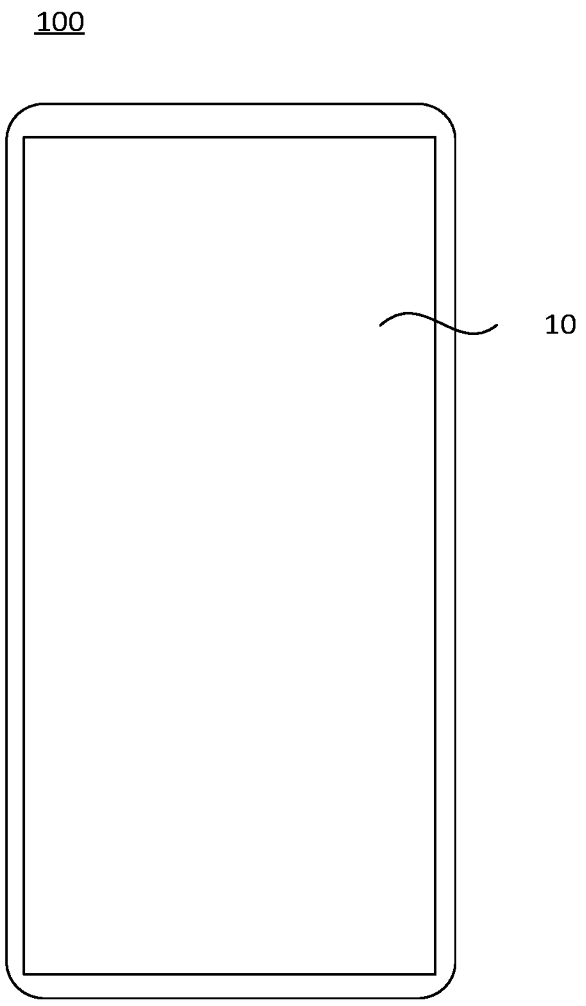
FIG. 12 is a structure diagram of a display device according to an embodiment of the present disclosure.

Based on the inventive concept as described above, the embodiment of the present disclosure further provides a display device. FIG. 12 is a structure diagram of a display device according to an embodiment of the present disclosure. As shown in FIG. 12, a display device 100 includes the display panel 10 in the preceding embodiment. The display device includes the display panel described in any embodiment of the present disclosure. Therefore, the display device provided by the embodiment of the present disclosure has the corresponding beneficial effects of the display panel provided by the embodiments of the present disclosure. The details are not repeated here. For example, the display device may be an electronic device such as a mobile phone, a computer, a smart wearable device (such as a smart watch), an onboard display device, which is not limited in the embodiment of the present disclosure.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A display panel, comprising: a light-emitting element and a pixel circuit electrically connected to the light-emitting element, wherein the pixel circuit comprises a drive transistor and a first transistor, wherein a first terminal of the drive transistor is electrically connected to a power signal line, a first terminal of the first transistor is electrically connected to an initialization signal line; wherein a second terminal of the first transistor is electrically connected to the drive transistor, or the second terminal of the first transistor is electrically connected to the light-emitting element; and drive modes of the display panel comprise at least a first drive mode, a second drive mode, and a third drive mode, wherein the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, wherein $F_1>F_2>F_3$, $V_{ref1}\neq V_{ref2}$, $V_{ref1}$ $V_{ref3}$, $$\frac{F_2-F_3}{F_1-F_3}\neq\frac{|V_{ref2}-V_{ref3}|}{|V_{ref1}-V_{ref3}|}.$$

2. The display panel according to claim 1, wherein $$\frac{F_2-F_3}{F_1-F_3}<\frac{|V_{ref2}-V_{ref3}|}{|V_{ref1}-V_{ref3}|}.$$

3. The display panel according to claim 1, wherein $|V_{ref2}-V_{ref3}|>|V_{ref1}-V_{ref2}|$.

4. The display panel according to claim 1, wherein the drive modes of the display panel comprise an i-th drive mode and a j-th drive mode, and the j-th drive mode comprises a signal writing stage and a light emission holding stage, wherein i and j are both integers, and i≠j; and the i-th drive mode corresponds to an i-th drive frequency $F_1$ and an i-th initialization signal $V_{refi}$, the j-th drive mode corresponds to a j-th drive frequency $F_1$, the signal writing stage in the j-th drive mode corresponds to a j1-th initialization signal $V_{refj1}$, and the light emission holding stage in the j-th drive mode corresponds to a j2-th initialization signal $V_{refj2}$;

wherein $F_j<F_1$, and $|V_{ref\,j2}|>|V_{ref\,j1}|>|V_{refi}|$.

5. The display panel according to claim 1, wherein the drive transistor comprises a P-type transistor, and $V_{ref3}<V_{ref2}<V_{ref1}<0$; or the drive transistor comprises an N-type transistor, and $V_{ref3}>V_{ref2}>V_{ref1}>0$.

6. The display panel according to claim 1, wherein the drive modes of the display panel comprise a k-th drive mode and an 1-th drive mode, and the k-th drive mode is a dominant-frequency drive mode; and the k-th drive mode corresponds to a k-th drive frequency $F_k$ and a k-th initialization signal $V_{refk}$, and the 1-th drive mode corresponds to an 1-th drive frequency $F_1$ and an 1-th initialization signal $V_{ref1}$;

wherein $F_1<F_k$, and $F_k$ is an integer multiple of $F_1$, and $$|V_{refk}-V_{refl}|=\left(\frac{F_k}{F_l}-1\right)\times 0.1.$$

7. The display panel according to claim 1, wherein the drive modes of the display panel comprise an s-th drive mode and a w-th drive mode, and the w-th drive mode is a highest-frequency drive mode; and the s-th drive mode corresponds to an s-th drive frequency $F_s$ and an s-th initialization signal $V_{ref\,s}$, and the w-th drive mode corresponds to a w-th drive frequency $F_w$ and a w-th initialization signal $V_{ref\,w}$;

wherein $$\frac{F_w-F_s}{F_s\times 30}\leq|V_{refs}-V_{refw}|\leq\frac{F_w-F_s}{F_s\times 10}.$$

8. The display panel according to claim 1, wherein the first drive mode further corresponds to a first power signal $V_{dd1}$, the second drive mode further corresponds to a second power signal $V_{dd2}$, and the third drive mode further corresponds to a third power signal $V_{dd3}$;

wherein $$\frac{F_2-F_3}{F_1-F_3}\neq\frac{|V_{dd2}-V_{dd3}|}{|V_{dd1}-V_{dd3}|}.$$

9. The display panel according to claim 8, wherein $$\frac{F_2-F_3}{F_1-F_3}<\frac{|V_{dd2}-V_{dd3}|}{|V_{dd1}-V_{dd3}|}.$$

10. The display panel according to claim 8, wherein $|V_{dd2}-V_{dd3}|>|V_{dd1}-V_{dd2}|$.

11. The display panel according to claim 8, wherein the drive modes of the display panel comprise an m-th drive mode and an n-th drive mode, and the n-th drive mode comprises a signal writing stage and a light emission holding stage, wherein m and n are both integers, and m≠n;

the m-th drive mode corresponds to an m-th drive frequency $F_m$ and an m-th power signal $V_{ddm}$, the n-th drive mode corresponds to an n-th drive frequency $F_n$, the signal writing stage in the n-th drive mode corresponds to an n1-th initialization signal $V_{ddn1}$, and the light emission holding stage in the n-th drive mode corresponds to an n2-th initialization signal $V_{ddn2}$;

$F_n<F_m$; and the drive transistor comprises a P-type transistor, and $V_{dn2}>V_{dn1}>V_{ddm}>0$; or the drive transistor comprises an N-type transistor, and $0<V_{ddn2}<V_{ddn1}<V_{ddm}$.

12. The display panel according to claim 8, wherein the drive transistor comprises a P-type transistor, and $V_{dd3}>V_{dd2}>V_{dd1}>0$; or the drive transistor comprises an N-type transistor, and $0<V_{dd3}<V_{dd2}<V_{dd1}$.

13. The display panel according to claim 8, wherein $$\frac{|V_{ref2}-V_{ref3}|}{|V_{ref1}-V_{ref3}|}>\frac{|V_{dd2}-V_{dd3}|}{|V_{dd1}-V_{dd3}|}.$$

14. The display panel according to claim 8, wherein $|V_{dd1}-|V_{ref1}|>|V_{dd2}-|V_{ref2}|>|V_{dd3}-|V_{ref3}|$.

15. The display panel according to claim 8, wherein the drive modes of the display panel comprise a p-th drive mode and a q-th drive mode, and the q-th drive mode is a dominant-frequency drive mode, wherein p and q are both integers, and p≠q;

the p-th drive mode corresponds to a p-th drive frequency $F_p$, a p-th initialization signal $V_{refp}$, and a p-th power signal $V_{ddp}$, and the q-th drive mode corresponds to a q-th drive frequency $F_q$, a q-th initialization signal $V_{ref\ q}$, and a q-th power signal $V_{ddq}$; and the drive transistor comprises a P-type transistor, and $$(V_{ddp} - V_{refp}) = (V_{ddq} - V_{refq}) + \left(\frac{F_q}{F_p} - 1\right) \times 0.1;$$

or the drive transistor comprises an N-type transistor, and $$(V_{refp} - V_{ddp}) = (V_{refq} - V_{ddq}) + \left(\frac{F_q}{F_p} - 1\right) \times 0.1;$$

wherein $F_q$ is an integer multiple of $F_p$.

16. The display panel according to claim 1, wherein the second terminal of the first transistor is electrically connected to a gate of the drive transistor; or the second terminal of the first transistor is electrically connected to a second terminal of the drive transistor through a second transistor.

17. A driving method of a display panel, which is applied for driving a display panel, wherein the display panel comprises a light-emitting element and a pixel circuit electrically connected to the light-emitting element, wherein the pixel circuit comprises a drive transistor and a first transistor, wherein a first terminal of the drive transistor is electrically connected to a power signal line, a first terminal of the first transistor is electrically connected to an initialization signal line; wherein a second terminal of the first transistor is electrically connected to the drive transistor, or the second terminal of the first transistor is electrically connected to the light-emitting element; and drive modes of the display panel comprise at least a first drive mode, a second drive mode, and a third drive mode, wherein the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, wherein the driving method comprises:

driving, in the first drive mode, the pixel circuit using the first drive frequency and the first initialization signal;

driving, in the second drive mode, the pixel circuit using the second drive frequency and the second initialization signal; and driving, in the third drive mode, the pixel circuit using the third drive frequency and the third initialization signal;

wherein $F_1>F_2>F_3$, and $V_{ref1} \neq V_{ref2}$, $V_{ref1} \neq V_{ref3}$, $$\frac{F_2 - F_3}{F_1 - F_3} \neq \frac{|V_{ref2} - V_{ref3}|}{|V_{ref1} - V_{ref3}|}.$$

18. The driving method according to claim 17, wherein a gate of the first transistor is electrically connected to a scan signal input terminal; and a switching moment of an initialization signal input to the initialization signal terminal is earlier than a switching moment of a scan signal input to the scan signal input terminal when different drive modes are switched; and a switching moment of an initialization signal corresponding to a current drive mode is within an enable stage of a light emission control signal corresponding to a previous drive mode.

19. A display device, comprising a display panel, wherein the display panel comprises:

a light-emitting element and a pixel circuit electrically connected to the light-emitting element, wherein the pixel circuit comprises a drive transistor and a first transistor, wherein a first terminal of the drive transistor is electrically connected to a power signal line, a first terminal of the first transistor is electrically connected to an initialization signal line; wherein a second terminal of the first transistor is electrically connected to the drive transistor, or the second terminal of the first transistor is electrically connected to the light-emitting element; and drive modes of the display panel comprise at least a first drive mode, a second drive mode, and a third drive mode, wherein the first drive mode corresponds to a first drive frequency $F_1$ and a first initialization signal $V_{ref1}$, the second drive mode corresponds to a second drive frequency $F_2$ and a second initialization signal $V_{ref2}$, and the third drive mode corresponds to a third drive frequency $F_3$ and a third initialization signal $V_{ref3}$, wherein $F_1>F_2>F_3$, $V_{ref1}+V_{ref2}$, $$V_{ref1} \neq V_{ref3}, \frac{F_2 - F_3}{F_1 - F_3} \neq \frac{|V_{ref2} - V_{ref3}|}{|V_{ref1} - V_{ref3}|}.$$

20. The display device according to claim 19, wherein $$\frac{F_2 - F_3}{F_1 - F_3} < \frac{|V_{ref2} - V_{ref3}|}{|V_{ref1} - V_{ref3}|}.$$

* * * * *